(12) United States Patent
Chiang et al.

(10) Patent No.: US 6,779,015 B1
(45) Date of Patent: Aug. 17, 2004

(54) METHOD FOR IMPLEMENTATION OF POWER CALCULATION ON A FIXED-POINT PROCESSOR USING TABLE LOOKUP AND LINEAR APPROXIMATION

(75) Inventors: Da-Ming Chiang, Basking Ridge, NJ (US); Daisuke Matsuda, Mountain View, CA (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 513 days.

(21) Appl. No.: 09/722,086

(22) Filed: Nov. 24, 2000

Related U.S. Application Data (60) Provisional application No. 60/213,160, filed on Jun. 22, 2000.

(51) Int. Cl.$^7$ ................................................ G06F 7/38
(52) U.S. Cl. ........................................ 708/606; 708/277
(58) Field of Search ............................... 708/270, 272, 708/277, 606

(56) References Cited

U.S. PATENT DOCUMENTS 5,195,052 A * 3/1993 Karim ......................... 708/606
5,974,436 A * 10/1999 Inoue et al. ................. 708/606
6,363,407 B1 * 3/2002 Miyasaka et al. ........... 708/606
6,480,873 B1 * 11/2002 Inoue et al. ................. 708/606

* cited by examiner

Primary Examiner—Chuong Dinh Ngo
(74) Attorney, Agent, or Firm—Wagner, Murabito & Hao LLP (57) ABSTRACT

A method for calculating the power of an integer raised to a constant real number. The method may be used to process digital signals, which are encoded in such a fashion as to require such processing. An embodiment of the present invention first receives a segment of a bitstream. Next, the process determines whether an integer value of the segment is within a look-up table. The look-up table contains a list of integers and a corresponding list of the integers raised to the power of a real number. If the integer value is within the look-up table, the process indexes the look-up table with the integer value to determine substantially the value of the integer raised to the real power. If, however, the integer value is not within the look-up table, the process indexes the table with a plurality of integers which are within the table to approximate the value of the segment from the bitstream raised to the real power. The process repeats these steps for each segment in the signal bitstream.

21 Claims, 5 Drawing Sheets

FIGURE 1

|   | INTEGER | POWER (INTEGER, 4/3) (FIXED POINT PRESENTATION) |
|---|---|---|
|   | 0 | 0 |
|   | 1 | 2048 |
| n | 2 | 5161 |
|   | 3 | 8861 |
|   | 4 | 13004 |
|   | 5 | 17510 |
|   | 6 | 22329 |
|   | . |   |
|   | . |   |
|   | . |   |
| m | 442 | 6895401 |
| m+1 | 443 | 6916210 |
|   | . |   |
|   | . |   |
|   | . |   |
|   | 512 | 8388607 |

FIGURE 5

METHOD FOR IMPLEMENTATION OF POWER CALCULATION ON A FIXED-POINT PROCESSOR USING TABLE LOOKUP AND LINEAR APPROXIMATION

RELATED U.S. APPLICATION

This Application is related to U.S. Provisional Application entitled, "Implementation of Power Calculation on Fixed-Point Processor Using Table Lookup and Linear Approximation," Application No. 60/213,160, filed on Jun. 22, 2000. This provisional application is hereby incorporated by reference.

FIELD OF THE INVENTION

The present invention relates to the field of digital signal processing. Specifically, the present invention relates to a method for efficiently calculating powers of integers using an optimized combination of table lookup and linear approximation which itself uses table lookup.

BACKGROUND ART

Many computer applications require the calculation of raising an integer to the power of a real number. In a desktop personal computer, the calculation may be performed by using a floating point processor. Furthermore, a math library may commonly be used to assist the process. However, a fixed point processor may be more suitable for many consumer electronic devices. Among other reasons for this choice, fixed point processors are frequently less expensive than floating point processors. One task that such consumer devices may perform is digital signal processing, which may require the calculation of raising an integer to the power of a real number. However, when performing power calculation with a fixed-point processor, conventional techniques may present undesirable consequences.

One conventional method for performing power calculation with a fixed-point processor is table look-up. However, some applications, such as performing calculation during an inverse quantization step of decoding an MPEG bitstream require a very large table. For example a table with over 8,000 entries may be required. Unfortunately, memory may be limited in many devices in which such decoding is done, for example consumer electronic-devices. Thus, building large tables in undesirable.

Another conventional method for performing power calculation is approximation. However, approximation introduces larger errors and uses more CPU cycles, which is critical to systems with limited CPU and memory resources, such as consumer electronic devices.

Therefore, when using either of these conventional methods, the software engineer chooses between getting a reasonably accurate answer but using a considerable amount of memory or using less memory but consuming more CPU cycles and also, introducing larger errors.

SUMMARY OF THE INVENTION

Therefore, it would be advantageous to provide a method for calculating the power of an integer raised to constant real number, which is suitable for use in fixed point processors. A further need exists for such a method which uses limited memory efficiently. A still further need exist for such a method which is computationally efficient. An even further need exists for such a method which, over the most commonly calculated values, does not introduce large errors. A still further need exists for such a method which is suitable for digital signal processing.

The present invention provides a method for efficiently calculating powers of integers using an optimized combination of table lookup and linear approximation which itself uses table lookup. Embodiments of the present invention are well-suited to being used in fixed point processors. Embodiments of the present invention use limited memory efficiently. Embodiments provide for a method which is computationally efficient. Embodiments provide for such a method which, over the most commonly calculated values, does not introduce large errors. Embodiments are suitable for digital signal processing. The present invention provides these advantages and others not specifically mentioned above but described in the sections to follow.

A method for calculating the power of an integer raised to a constant real number is disclosed. For example, in one embodiment, the method may be used to process digital signals, which are encoded in such a fashion as to require such processing. An embodiment of the present invention first receives a segment of a bitstream. Next, the process determines whether an integer value of the segment is within a look-up table. The look-up table contains a plurality of integers and a corresponding plurality of the integers raised to the power of a real number. If the integer value is within the look-up table, the process indexes the look-up table with the integer value to determine substantially the value of the integer raised to the real power. If, however, the integer value is not within the look-up table, the process indexes the table with a plurality of integers which are within the table to approximate the value of the segment from the bitstream raised to the real power. The process repeats these steps for each segment in the signal bitstream.

Another embodiment performs, in addition to the above steps, the step of determining an integer which is larger than the segment divided by the largest integer in the table. This provides a first integer that is used to index the lookup table in the approximation process. Additionally, the process divides the integer value of the segment by the first integer. This provides a second integer that is used to index the lookup table in the approximation process. After indexing the table with the integers, the process combines the results according to a formula. This provides an approximation of the value of the segment raised to the power of the real number. The process may then output the processed signal.

In one embodiment, the input signal is substantially compliant with a Motion Pictures Expert Group (MPEG) format, for example, MPEG audio layer III. In another embodiment, the input signal comprises a plurality of quantized samples.

Another embodiment provides for a computer readable medium containing a computer program that, when executed by a processor, implements a method of processing an encoded information signal-using a combination of straight table lookup and approximation that uses the same table. The encoded information bitstream may contain quantized samples and the method may produce de-quantized samples. In one embodiment, the processor is a fixed point processor.

In yet another embodiment, one of the plurality of integers which is used for approximation is determined before the segment in the bitstream to be processed is accessed. For example, a software engineer determines this integer to be used in approximation based upon the largest expected value of the segment.

DETAILED DESCRIPTION OF THE INVENTION

In the following detailed description of the present invention, a method for power calculation on fixed-point processors using table lookup and linear approximation, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Power Calculation

The present invention provides for a method for efficiently calculating the value of an integer raised to a real power. Embodiments of the present invention use a combination of straight table lookup and linear approximation that uses table lookup.

Figure 1:
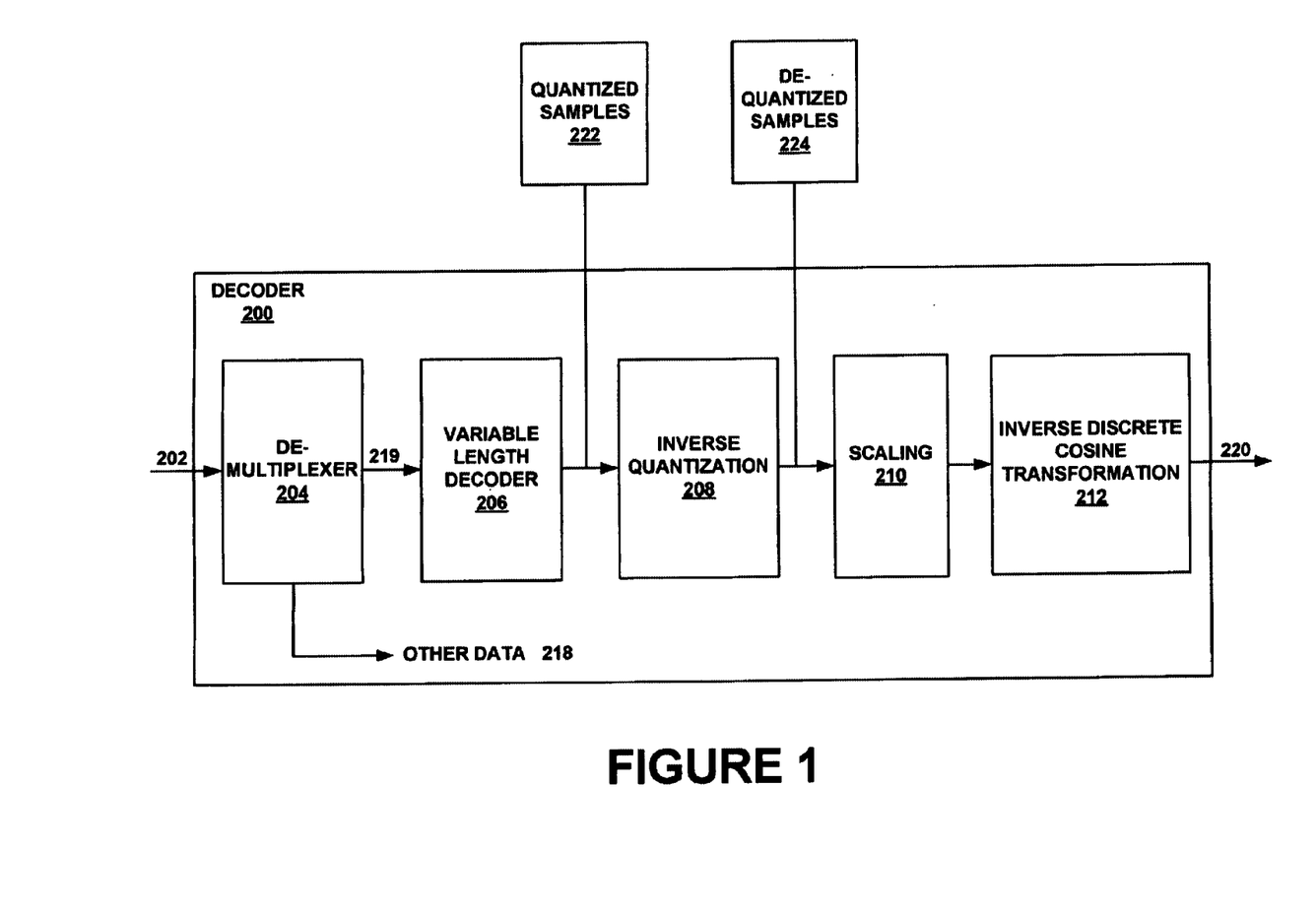
FIG. 1 is an exemplary decoder, in which embodiments of the present invention may be performed.

While the present invention is well-suited to a variety of applications, for illustrative purposes, an example of decoding an audio signal will be discussed. FIG. 1 illustrates an exemplary decoder 200. For example, the decoder 200 may be an audio signal decoder, although the present invention is not limited to such a decoder 200. For example, the decoder 200 may be compliant with International Standards Organization Motion Pictures Experts Group (ISO MPEG) Audio Layer III, or the like. Thus, the quantizer 208 may be operable to process non-uniform quantized samples 222, for example, samples 222 quantized with a power law. The decoder 200 inputs an encoded information bitstream 202 to de-multiplexer 204. For example, the encoded information bitstream 202 may be an MPEG audio bitstream. The de-multiplexer 204 outputs a variable length coded bitstream 219, for example, a Huffman coded bitstream. The de-multiplexer 204 outputs other data 218, as well.

Still referring to FIG. 1, the variable length decoder 206 (VLD) outputs quantized encoded information (e.g., quantized samples 222). The quantized samples 222 are processed by the inverse quantization logic 208, in which power calculation using table lookup and linear approximation may be used. However, the present invention is not limited to performing the power calculation in the inverse quantization logic 208. Embodiments of the present invention may be used anytime a power calculation is to be performed.

Still referring to FIG. 1, the Inverse Quantization stage 208 outputs de-quantized encoded information (e.g., de-quantized samples 224). The de-quantized samples 224 are input to the scaling logic 210. The scaling logic 210 sends it output to the inverse discrete cosine transform ($DCT^{-1}$) logic 212, which performs the inverse of a DCT process used by a bitstream encoder (not shown). The output of the decoder 200 is a pulse code modulated (PCM) waveform 220, assuming the decoder 200 is an audio decoder processing MPEG signals.

The present invention is well-suited to operating in a wide range of devices and is especially well-suited for applications in which memory and processor power is limited. Embodiments of the present invention are well-suited for fixed-point processors. However, they are not limited to such cases. For example, embodiments of the present invention are well-suited to operating in the quantization stage of an encoder, as the audio decoder 200 performs the reverse of the encoder. Additionally, the present invention is well-suited to other signal processing devices.

Figure 2:
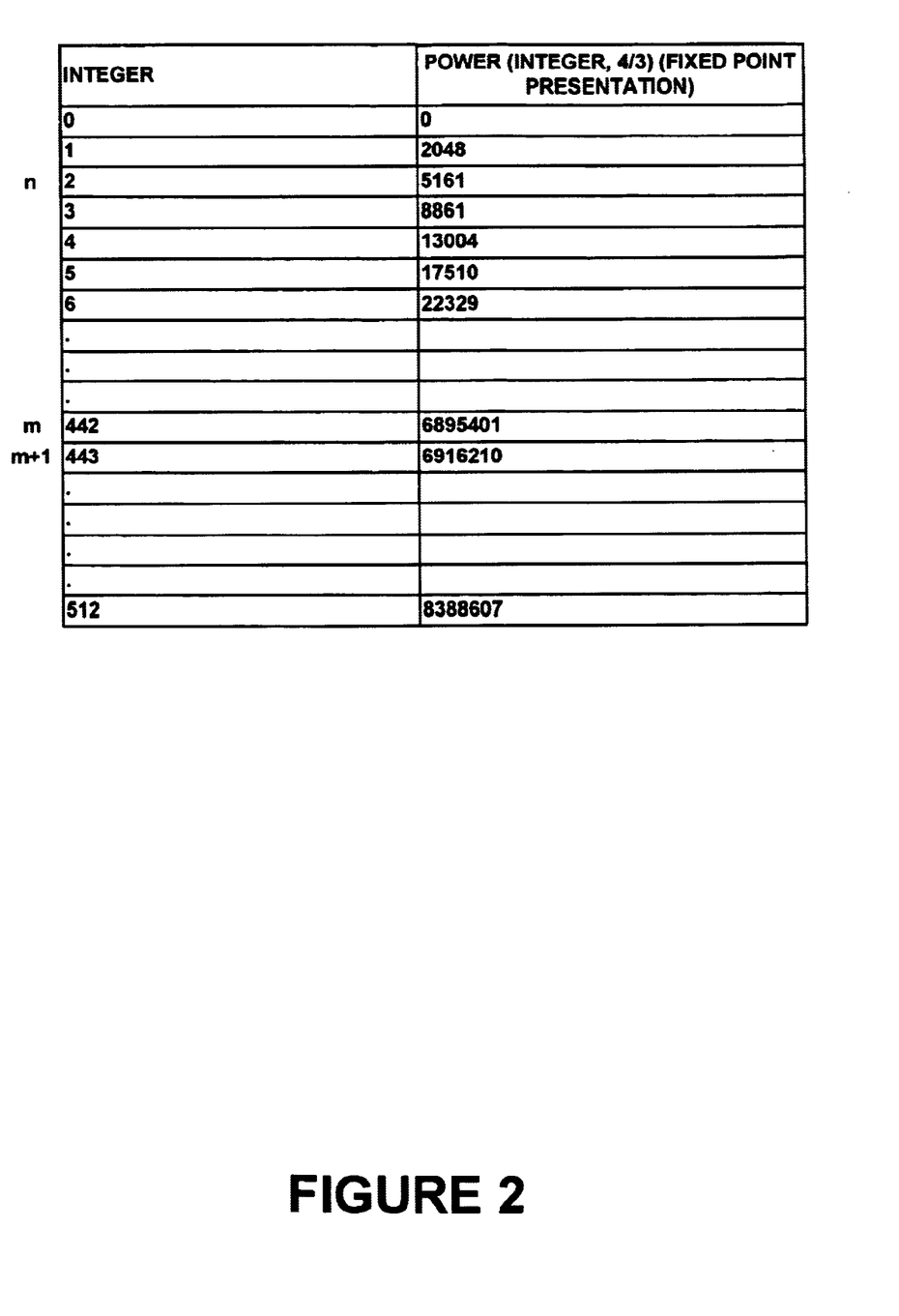
FIG. 2 is an exemplary look-up table, according to an embodiment of the present invention.

FIG. 2 illustrates an exemplary Table 250 which may be used in an embodiment of the present invention. In this example, integers along with the fixed point integer representation of $integer^{4/3}$ are stored. The power of 4/3 is exemplary to illustrate the MPEG audio example. The table size is selected to optimize the use of memory, CPU time, and accuracy of the power calculation. In one embodiment, the table size is 513 integers ranging from zero to 512. When the integer (e.g., quantized sample 222) to be processed is small, straight table lookup is used for very fast and accurate results. When the integer 252 is outside of the table 250, approximation is performed, but again using the table 250. Thus, the table 250 of limited size may be used to efficiently approximate power calculation of integers over a very wide range.

The present invention is well-suited to tables 250 of any size and any power. Furthermore, the table 250 may contain more than one power for each integer. Assuming a table 250 size of 'N', with an integer 'x' (e.g., quantized sample 222), embodiments of the present invention may use straight table lookup when ($0 \leq x \leq N-1$). When 'x' (e.g., quantized sample 222) falls outside of the table 250, linear approximation is applied, using the same table 250.

One embodiment of the present invention first chooses the smallest integer 'n' that satisfies the condition: integer(x/n) <N-1. Next, an integer 'm' is found where m=integer(x/n). Using the values 'n', 'm', and 'm+1', which are within the table 250, embodiments of the present invention may use table lookup to approximate $x^a$, with 'x' outside of the table 250. For example, $884^a$ may be approximated by; using the table to find the values for $2^a$, $442^a$, and $443^a$. These values are combined according to a pre-determined formula given by Equation 1 below.

Figure 3:
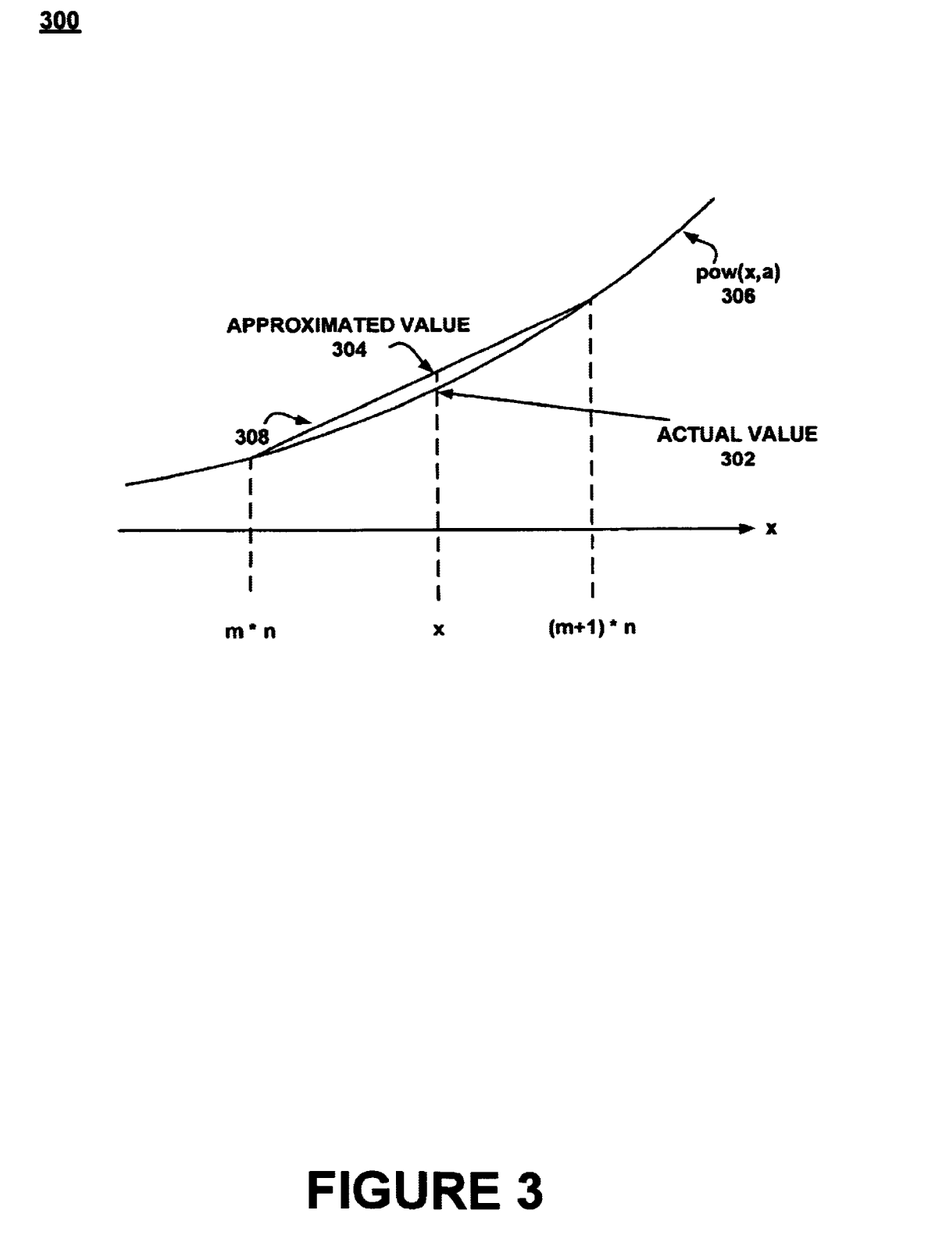
FIG. 3 is a graph illustrating a method of approximating values of an integer raised to a constant real number, using table look-up, according to an embodiment of the present invention.

The graph 300 in FIG. 3 illustrates a linear approximation technique, which embodiments of the present invention use when the integer (e.g., quantized sample 222) is outside of the lookup table 250. The actual value of $x^a$ is the point 'actual value' 302 on the-curve of pow(x,a) 306. This value may be approximated by determining the point 'approximated value' 304. For example, the approximated value 304 is on a line 308 formed between the points pow(m*n, a) and pow((m+1)*n, a). Furthermore, the approximated value 304 is very near the actual value 302. The approximated value 304 is given by Equation 1 below, which may be derived from the graph 300.

$$\text{approx val} = n^a * ((x-m*n)*(m+1)^a + ((m+1)*n-x)*m^a))/n \quad \text{Equation 1:}$$

Because n, m, and m+1 are all between 0 and N-1 (both inclusive), $n^a$, $(m+1)^a$, and $m^a$ can all be efficiently retrieved from the lookup table 250. Furthermore, by restricting 'n' to be a power of 2, division by 'n' may be achieved efficiently by a right shift operation. Thus, embodiments of the present invention are well-suited to operating in fixed point processors.

As an example of applying power calculation using table lookup and linear approximation, one embodiment performs an inverse quantization on an MPEG audio bitstream. As one part of the MPEG specification calls for raising a value to the power of 3/4 when quantizing values in a bitstream (e.g., MPEG audio layer III), the reverse is done in the decoder 200. For example, a quantized sample 222 is raised to the 4/3 power as a part of the de-quantization process. The inverse quantization in the decoder 200 may comprise steps other than raising the quantized sample 222 to the 4/3 power.

Figure 4:
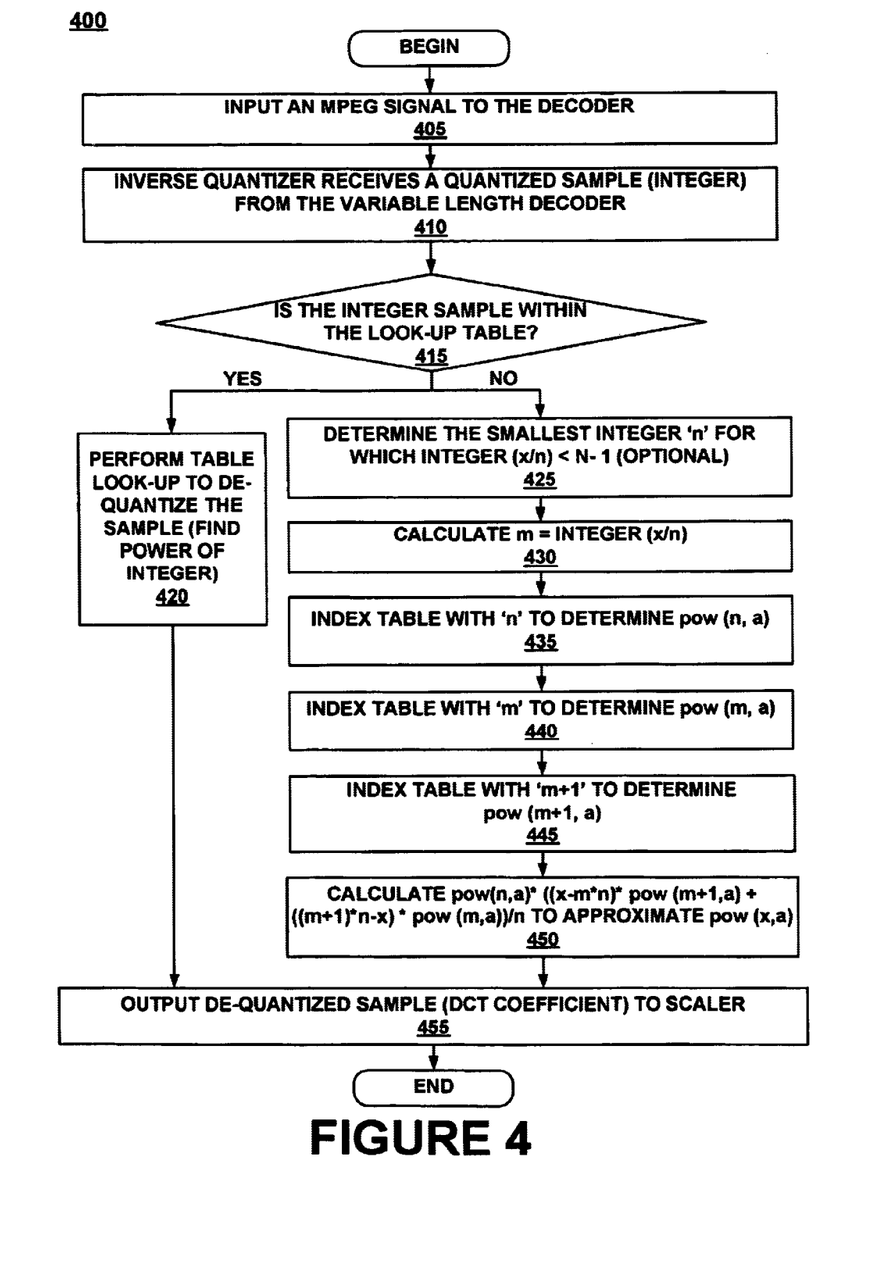
FIG. 4 is a flowchart illustrating the steps of processing a signal using table lookup and linear approximation, according to an embodiment of the present invention.
Figure 5:
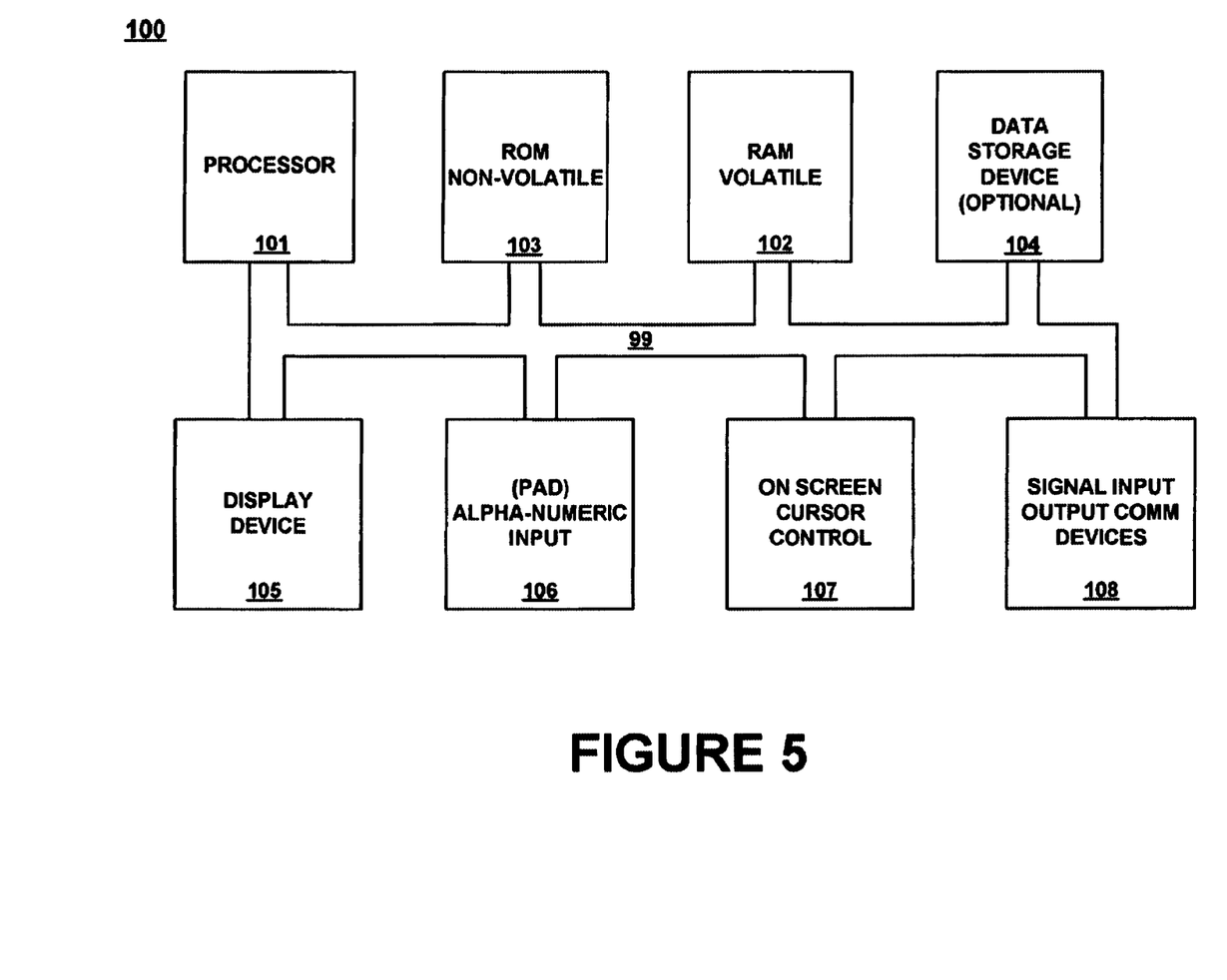
FIG. 5 is a schematic of a computer system, which may be used to implement embodiments of the present, invention.

The steps of a process 400 for processing a signal using table lookup and linear approximation are illustrated in the flowchart of FIG. 4. Process 400 may be performed within computer system 100 (FIG. 5). Process 400 may be used to for a wide variety of applications in which power calculation is to be performed, such as digital signal processing, or the like. In step 405, the decoder 200 inputs an MPEG audio bitstream 202. The present invention is not limited to operating with MPEG audio bitstreams. The present invention is well-suited to processing any signal for which a power calculation of an integer must be performed.

In step 410, the inverse quantization stage 208 receives a quantized sample 222 from the variable length decoder stage 206. In this case, the power calculation needs to be done to perform the inverse quantization of the integer value of the quantized sample 222, so that an encoded audio signal 202 may be decoded.

In step 415, the process 400 determines whether the integer value of the quantized sample 222, is within the lookup table 250. For example, for MPEG-2 ACC, the quantized sample 222 value may range from 0 to 8191. However, the present invention is well-suited to expecting values over any range.

If the value of the quantized sample 222, is within the table 250, then the process 400 accesses the lookup table 250 to determine the value of the quantized sample 222 raised to the real value, in step 420. As most values are relatively small in the MPEG audio embodiment, for example, less than 513, the process 400 will take this route most of the time. However, the present invention may also be used for cases in which the straight lookup path is not taken a majority of times. The percentage of times that this path is taken will depend, in part, upon the size of the table 250. Therefore, a software engineer may determine a suitable table size to optimize performance.

If, however, the value of the integer (e.g., quantized sample 222) is outside of the table 250, the path starting at step 425 is performed to approximate the integer raised to the power of 'a'. In step 425, the process 400 performs the optional step of determining the smallest integer 'n'for which Integer(x/n)<N-1 holds true, where 'x' is the quantized sample 222 and 'N' is the table size, which may be fixed by a software, engineer. In another embodiment, the integer 'n' is determined by a software engineer, and therefore, fixed. For example, the integer 'n' is determined based on the expected maximum value of the quantized sample 222 ('x') along with the pre-determined table size 'T'. The expected-maximum value of the quantized sample 222 may be determined based on the specification for the data being processed. The integer 'n' is used in the approximation process.

Next, step 430 is done to calculate a second integer to be used in the approximation process. This step calculates: m=integer (x/n).

In steps 435–445, the process 400 indexes the table 250 with the integers determined previously. For example, the table 250 is indexed to find $n^a$, $m^a$, and $(m+1)^a$.

These value are then used, in step 450, to find the approximation of $x^a$ using Equation 1. For example, the result of the indexing are combined in order to approximate the value of the quantized sample 222 raised to the real number. In this fashion, the 'approximate value' (FIG. 3, 304) is found.

In step 455, the process 400 outputs the de-quantized sample 224. It will be understood by those in the art that the de-quantization process may comprise additional steps not shown so as to not obscure aspects of the present invention.

The following is exemplary pseudocode for an approximation process of one embodiment:

InvQuantTable [513]={0,1,2,3 . . . 512}(Table contains pow(i, 4/3 ) (i=0–512)
sign=1 (sign of result value)
input: X, output: InvQuantX ($0 \leq x \leq 8191$)
if (X<0) then X=−X, sign=−1
if (X$\leq$512) then
   InvQuantX=sign*InvquantTable[X]
   go to end
if (X<1024) then shift=2
else if (X<2048) then shift=2
else if (X<4096) then shift=3
else shift=4
n=1<<shift (n=2, 4, 8, 16)
m=X>>shift (m=int(X/n))
InvQuantX=sign InvQuantTable [n]*((X−m*n) *InvQuantTable[m+1]+((m+1)*n−X)*InvQuantTable [m]>>shift end FIG. 5 illustrates circuitry of computer system 100, which may form a platform for a portion of the decoder 200. Computer system 100 includes an address/data bus 99 for communicating information, a central processor 101 coupled with the: bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions. In one embodiment the processor 101 is a fixed point processor.

With reference still to FIG. 5, system 100 of the present invention also includes an optional alphanumeric input device 106 including alphanumeric and function keys is coupled to bus 99 for communicating information and command selections to central processor unit 101. System 100 also optionally includes a cursor control device 107 coupled to bus 99 for communicating user input information and command selections to central processor unit 101. System 100 of the present embodiment also includes an optional display device 105 coupled to bus 99 for displaying information. Signal input/output communication device 108 is also coupled to bus 99.

The preferred embodiment of the present invention a method for efficiently calculating powers of integers using an optimized combination of table lookup and linear approximation which itself uses table lookup is thus described. While the present invention has been described in particular embodiments, it should be appreciated that the present invention should not be construed as limited by such embodiments, but rather construed according to the below claims.

What is claimed is:

1. In a computer system having a processor coupled to a bus, a computer readable medium coupled to said bus and having stored therein a computer program that when executed by said processor causes said computer system to implement a method of processing an encoded information signal comprising:
   a) receiving a segment of an encoded information signal, wherein said segment comprises quantized information;
   b) determining whether an integer value of said segment is within a table residing in said computer readable medium, said table comprising a plurality of integers and a corresponding plurality of said integers raised to the power of a real number;
   c) if the integer value of said segment is in said table, indexing said table with said integer value of said segment to determine substantially said integer value of said segment raised to the power of the real number;
   d) if the integer value of said segment is not within said table, indexing said table with a plurality of integers and combining results of said indexing said table with the plurality of integers to approximate said integer value of said segment raised to the power of the real number; and
   e) repeating said a) through said d) to produce a de-quantized encoded information signal.

2. The computer readable medium of claim 1 wherein said d) of said method comprises:
   d1) determining a first of said plurality of integers by determining an integer which is larger than said integer value of said segment divided by the largest integer in said table.

3. The computer readable medium of claim 2 wherein said d) of said method further comprises:
   d2) determining a second of said plurality of integers by dividing the integer value of said segment by the first of said plurality of integers.

4. The computer readable medium of claim 3 wherein said indexing said table with a plurality of integers in d) of said method further comprises:
   d3) indexing said table with said first of said plurality of integers to determine said first of said plurality of integers raised to the power of said real number;
   d4) indexing said table with said second of said plurality of integers to determine said second of said plurality of integers raised to the power of said real number; and
   d5) indexing said table with an integer one larger than said second of said plurality of integers.

5. The computer readable medium of claim 1 wherein said encoded information signal is substantially compliant with a Motion Pictures Expert Group format.

6. The computer readable medium of claim 1 wherein said segment is quantized according to a power law.

7. A method for de-quantizing encoded information, said method performed within an electronic device and comprising:
   a) receiving a segment of said encoded information;
   b) determining whether an integer value of said segment is within a table encoded in a computer readable medium within said electronic device, said table comprising a plurality of integers and a corresponding plurality of said integers raised to the power of a real number;
   c) if the integer value of said segment is in said table, indexing said table with said integer value of said segment to determine substantially said integer value of said segment raised to said power of the real number;
   d) if the integer value of said segment is not within said table, indexing said table with a plurality of integers and combining results of said indexing said table with a plurality of integers to approximate said integer value of said segment raised to said power of the real number;
   e) repeating said a) through said d) with additional received segments of said encoded information to produce de-quantized encoded information; and
   f) outputting said de-quantized encoded information.

8. The method of claim 7 wherein said segments in said encoded information are quantized according to a power law.

9. The method of claim 7 wherein said de-quantized encoded information is substantially compliant with a Motion Pictures Expert Group format.

10. The method of claim 7 wherein said encoded information comprises a Motion Pictures Expert Group audio bitstream.

11. The method of claim 7, wherein said d) comprises:
   d1) determining a first of said plurality of integers by determining an integer which is larger than said integer value of said segment divided by the largest integer in said table; and
   d2) determining a second of said plurality of integers by dividing the integer value of said segment by the first of said plurality of integers.

12. The method of claim 11, wherein said indexing said table with a plurality of integers in said d) further comprises:
   indexing said table with said first of said plurality of integers to determine said first of said plurality of integers raised to the power of said real number;

indexing said table with said second of said plurality of integers to determine said second of said plurality of integers raised to the power of said real number; and indexing said table with an integer one larger than said second of said plurality of integers.

13. An electronic device for processing a signal comprising:

a processing unit comprising computer readable memory and a processor; and a lookup table stored in said computer readable memory and comprising a plurality of integers and a corresponding plurality of said integers raised to the power of a real number;

wherein said processing unit is operable to process said signal by:

accessing a segment of said signal;

determining whether an integer value of said segment is within said table;

if the integer value of said segment is in said table, indexing said lookup table with said integer value of said segment to determine substantially said integer value of said segment raised to said the power of the real number; and if the integer value of said segment is not within said table, determining a plurality of integers to index said table with based on said integer value of said segment, indexing said lookup table with said plurality of integers to generate intermediate results, and combining said intermediate results according to a predetermined formula to approximate said integer value of said segment raised to the power of the real number.

14. The electronic device of claim 13, wherein said processing unit is further operable to determine a first of said plurality of integers by determining an integer which is larger than said integer value of said segment divided by the largest integer in said table.

15. The electronic device of claim 14, wherein said first of said plurality of integers is the smallest such integer.

16. The electronic device of claim 14, wherein said processing unit is further operable to determine a second of said plurality of integers by dividing the integer value of said segment by the first of said plurality of integers.

17. The electronic device of claim 16, wherein said processing unit is further operable to:

index said table with said first of said plurality of integers to determine said first of said plurality of integers raised to the power of said real number;

index said table with said second of said plurality of integers to determine said second of said plurality of integers raised to the power of said real number; and index said table with an integer one larger than said second of said plurality of integers.

18. The electronic device of claim 14, wherein said first of said plurality of integers is a power of two.

19. The electronic device of claim 13, wherein said signal is substantially compliant with a Motion Pictures Expert Group format.

20. The electronic device of claim 13, wherein said format comprises Motion Pictures Expert Group audio layer III.

21. The electronic device of claim 13, wherein said bitstream comprises a plurality of quantized samples.

* * * * *